(12) United States Patent
Brule et al.

(10) Patent No.: US 8,076,406 B2
(45) Date of Patent: Dec. 13, 2011

(54) COMPOSITE BASED ON POLYLACTIC ACID AND A POLYAMIDE, HAVING IMPROVED IMPACT STRENGTH, AND ITS MANUFACTURING PROCESS AND USE

(75) Inventors: Benoit Brule, Beaumont-le-Roger (FR); Thomas Fine, Fontainebleau (FR); Jean-Jacques Flat, Goupillieres (FR); Maho Yasuda, Kyoto (JP)

(73) Assignee: Arkema France, Colombes (FR)

( * ) Notice: Subject to any disclaimer, the term of this patent is extended or adjusted under 35 U.S.C. 154(b) by 125 days.

(21) Appl. No.: 12/305,141

(22) PCT Filed: Jun. 14, 2007

(86) PCT No.: PCT/FR2007/051438
§ 371 (c)(1),
(2), (4) Date: Dec. 23, 2009

(87) PCT Pub. No.: WO2007/144543
PCT Pub. Date: Dec. 21, 2007

(65) Prior Publication Data
US 2010/0113677 A1    May 6, 2010

Related U.S. Application Data

(60) Provisional application No. 60/819,860, filed on Jul. 11, 2006.

(30) Foreign Application Priority Data

Jun. 16, 2006 (FR) ...................... 06 52158

(51) Int. Cl.
*C08L 67/04* (2006.01)
*C08L 77/00* (2006.01)

(52) U.S. Cl. .......... 524/514; 524/538; 525/66; 525/166; 525/170; 525/176; 525/178; 525/179; 525/182; 525/183

(58) Field of Classification Search ................... 525/66, 525/166, 170, 176, 178, 179, 182, 183; 524/514, 524/538

See application file for complete search history.

(56) References Cited

U.S. PATENT DOCUMENTS

| | | | |
|---|---|---|---|
| 7,354,973 B2 | 4/2008 | Flexman | |
| 7,381,772 B2 | 6/2008 | Flexman et al. | |
| 2004/0242803 A1 | 12/2004 | Ohme et al. | |

FOREIGN PATENT DOCUMENTS

| | | |
|---|---|---|
| JP | 9316310 | 9/1997 |
| JP | 2004051835 | 2/2004 |

*Primary Examiner* — Ana Woodward
(74) *Attorney, Agent, or Firm* — Thomas F. Roland

(57) ABSTRACT

The present invention relates to a composite having improved impact resistance. According to the invention, this composite is obtained from a composition comprising the following polymers: polylactic acid (PLA) which forms the matrix; at least one polyamide forming a dispersed phase within the PLA matrix; at least one functionalized polyolefin (A) comprising alpha-olefin units and epoxy, carboxylic acid or carboxylic acid anhydride units; and, optionally, at least one unfunctionnalized polyolefin (B).

10 Claims, 1 Drawing Sheet

US 8,076,406 B2

COMPOSITE BASED ON POLYLACTIC ACID AND A POLYAMIDE, HAVING IMPROVED IMPACT STRENGTH, AND ITS MANUFACTURING PROCESS AND USE

This application claims benefit, under U.S.C. §119 or §365 of French Application Number FR 0652158, filed Jun. 16, 2006; U.S. 60/819,860, filed Jul. 11, 2006; and PCT/FR2007/051438 filed Jun. 14, 2007.

FIELD OF THE INVENTION

The present invention relates to a polylactic acid-based composite polyamide, having improved impact strength.

BACKGROUND OF THE INVENTION

Materials based on polylactic acid (PLA) are currently used in the manufacture of fibers or films.

Although such materials are of major interest because of their biodegradable or renewable properties, they remain little employed in a number of fields owing to their relatively poor intrinsic properties, especially mechanical properties.

In particular, the use of commercially available materials based on polylactic acid by injection molding, for the manufacture, for example, of consumer goods such as portable telephone or computer parts, requires the impact strength and the thermomechanical properties of the PLA to be improved.

To improve such properties, and in particular the impact strength, of materials based on polylactic acid, it has been proposed to use a composite obtained from a composition comprising polylactic acid (PLA) and a polyamide. However, although the impact strength of the composite is actually improved by the addition of polyamide in the composition, it has been observed that the stiffness is reduced compared with that of a material made from a composition containing no polyamide and also that the thermomechanical resistance of the composite is insufficient.

To increase the impact strength of such composites while at the same time maintaining stiffness and thermomechanical resistance, document JP 2004-051835 describes a composite obtained from a particular composition comprising 100 parts by weight of polylactic acid and 1 to 100 parts by weight of what is called a "flexible" polyamide.

The "flexible" polyamide of the composition described in JP 2004-051835 is defined as being a polyamide having a flexural modulus of elasticity at room temperature of less than 2 GPa.

However, for some applications, such as those mentioned above (consumer goods), it has been observed that the impact strength of the composite described in document JP 2004-051835 is still not entirely satisfactory.

Furthermore, the composition described in JP 2004-051835 dictates a particular choice of polyamide, which may have a drawback, for example in terms of cost.

The object of the present invention is therefore to remedy the aforementioned drawbacks and to propose a composite that has an improved impact strength while still maintaining stiffness and thermomechanical resistance, especially one that is compatible with a method of manufacture by injection molding.

SUMMARY OF THE INVENTION

The present invention therefore relates to a composite of the aforementioned type, that is to say a composite obtained from a composition comprising polylactic acid (PLA) and a polyamide.

According to the invention, said composite is obtained from the following polymers:
  polylactic acid (PLA) as matrix or continuous phase of the composite.
  at least one polyamide as the disperse phase in PLA matrix.
    at least one functionalized polyolefin (A) comprising α-olefin units and epoxide, carboxylic acid or carboxylic acid anhydride units,
said composite do not contain polyoxymethylene (POM).

DETAILED DESCRIPTION OF THE INVENTION

Figure 1:
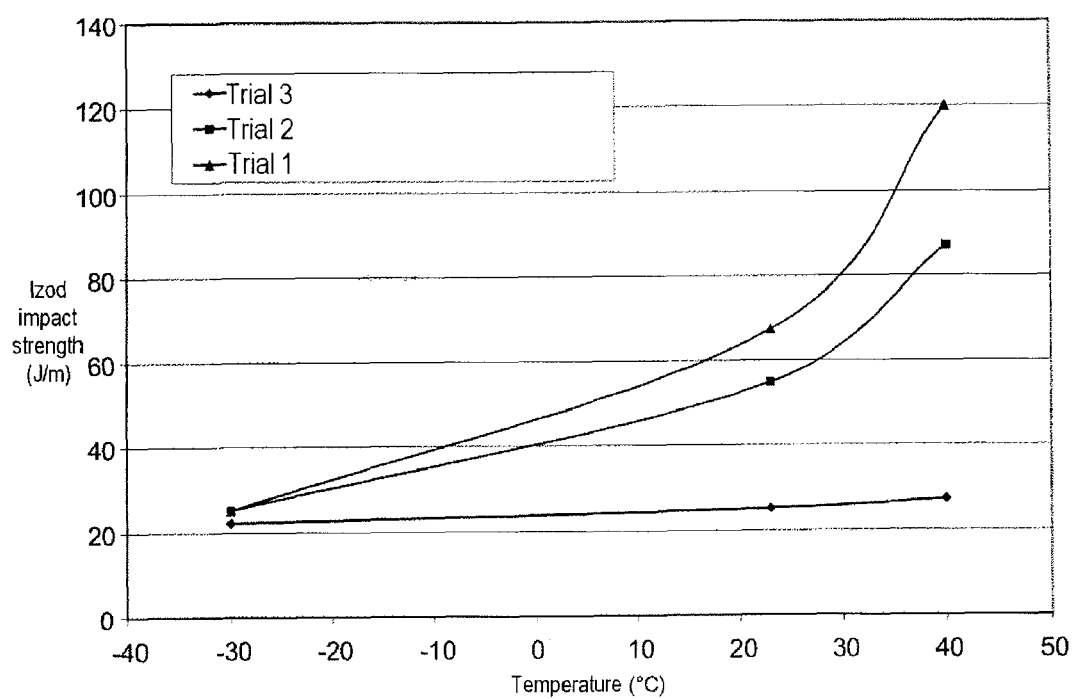
FIG. 1: Is a plot of the Izod impact strength at varying temperatures for the compositions of the Examples showing the improvement in impact strength for the compositions of the invention.

The functionalized polyolefin acts as compatibilizer between PLA and PA as well as nucleing component, thus improving thermomechanical properties of PLA.

The functionalized polyolefin (A) may in particular be chosen from the polymers listed below:
  SBS, SIS, SEBS block copolymers or EPDM that are grafted:
    by unsaturated epoxides, in particular glycidyl (meth) acrylate,
    by carboxylic acids, such as (meth)acrylic acid, or
    by anhydrides of unsaturated carboxylic acids, such as maleic anhydride;
  copolymers of ethylene, unsaturated epoxide and, optionally, an ester, an unsaturated carboxylic acid salt or a vinyl ester of a saturated carboxylic acid. As examples, mention may be made of ethylene/vinyl acetate/glycidyl (meth)acrylate and ethylene/alkyl (meth)acrylate/glycidyl (meth)acrylate terpolymers;
  copolymers of ethylene, an unsaturated carboxylic acid anhydride and, optionally, an ester, an unsaturated carboxylic acid which may be partially neutralized by a metal (Zn) or an alkali metal (Li), and a vinyl ester of a saturated carboxylic acid. As examples, mention may be made of ethylene/vinyl acetate/maleic anhydride, ethylene/alkyl (meth)acrylate/maleic anhydride and ethylene/Zn or Li (meth)acrylate/maleic anhydride terpolymers; and
  polyethylene, polypropylene, ethylene/propylene copolymers which are grafted or copolymerized with an unsaturated carboxylic acid anhydride, optionally condensed with a monoaminated polyamide (or polyamide oligomer). These compounds are described in document U.S. Pat. No. 5,342,886.

The alkyl (meth)acrylate mentioned above may especially be chosen from methyl acrylate, ethyl acrylate, n-butyl acrylate, isobutyl acrylate, 2-ethylhexyl acrylate, cyclohexyl acrylate, methyl methacrylate and ethyl methacrylate.

In one particularly advantageous version of the invention, the composite is obtained from the following polymers, excluding polyoxymethylene (POM):
  polylactic acid (PLA) as matrix of the composite;
  at least one polyamide as disperse phase of the composite
  at least one functionalized polyolefin (A) chosen from the group formed by an ethylene/acrylic ester/maleic anhydride terpolymer and an ethylene/methyl acrylate/glycidyl methacryate terpolymer.

The inventors have observed that the addition of at least one functionalized polyolefin (A) and, in particular, of one or both of the abovementioned terpolymers to a blend formed from polylactic acid and a polyamide, or polylactic acid and several polyamides (with the proviso of being industrially feasible), confers remarkable impact strength properties on the composite obtained and, thereby, on the particles manufactured from such a composite.

Such impact strength properties turn out to be in any case very substantially superior to those of the composites of the prior art based on just polylactic acid and a polyamide.

The improvement in impact strength is obtained while maintaining the stiffness and thermomechanical properties.

Among the abovementioned terpolymers, those sold by Arkema France under the brand name LOTADER® may especially be employed.

Contrary to the teaching of document JP 2004-051835, the choice of polyamide is unlimited.

Within the context of the present invention, the polyamide means any polycondensate obtained, by polycondensation, from one and the same monomer or from various monomers and including at least one amide functional group.

The polyamide may especially be obtained by the polycondensation of lactams, of amino acids, or of diacids with diamines, and also all possible combinations of two or more of these compounds (for example, lactam+diacid+diamine, several diacids with diamines, etc.).

Nonlimitingly, the polyamide (PA) may be a polyamide of the PA-X type, where X=6 to 12, or of the PA-X, Y type, called a homopolymer, where X=6 to 25 and Y=6 to 25, X and Y indicating the number of carbon atoms present in the polyamide chain between two "amide" functional groups.

Particularly advantageously, the polyamide is obtained from monomers having the property of being renewable, in the same way as polylactic acid.

The polyamide is the disperse phase, as nodules of disperse polyamide in a polylactic acid matrix or continuous phase.

In a variant of the invention, the composite is obtained from the following polymers, excluding polyoxymethylene (POM):
polylactic acid (PLA);
at least one polyamide;
at least one functionalized polyolefin (A) comprising α-olefin units and epoxide, carboxylic acid or carboxylic acid anhydride units and, more preferably, at least one functionalized polyolefin chosen from the group formed by an ethylene/acrylic ester/maleic anhydride terpolymer and an ethylene/methyl acrylate/glycidyl methacrylate terpolymer; and,
furthermore,
at least one unfunctionalized polyolefin (B).

The unfunctionalized polyolefin (B) is a polymer comprising "olefin" units, such as for example ethylene, propylene and 1-butene units, or any other α-olefin.

The unfunctionalized polyolefin (B) may in particular be chosen from the polymers listed below:
polyethylenes, such as LDPE, HDPE, LLDPE and VLDPE, polypropylene, ethylene/propylene copolymers, or else metallocene polyethylenes; and
copolymers of ethylene with at least one compound chosen from salts or esters of unsaturated carboxylic acids, and vinyl esters of saturated carboxylic acids. Examples may include ethylene/vinyl acetate and ethylene/alkyl (meth) acrylate copolymers.

The unfunctionalized polyolefin or polyolefins (B), in combination with the functionalized polyolefin or polyolefins (A), makes (make) it possible also to improve the impact strength of the composite according to the invention while still maintaining the viscosity at a value compatible with thermoplastic blending processes.

In one particularly advantageous version of the invention, the unfunctionalized polyolefin (B) is an ethylene/acrylic ester copolymer.

Preferably, the acrylic ester of the ethylene/acrylic ester copolymer is chosen from methyl acrylate, ethyl acrylate and butyl acrylate.

Among the ethylene/acrylic ester copolymers that can be used within the context of the present invention, mention may in particular be made to those sold by Arkema France under the brand name LOTRYL®.

In another variant of the invention, the percentages by weight of the various polymers are the following:
40 to 80% by weight of polylactic acid (PLA);
5 to 40% by weight of one or more polyamides; and
1 to 30% by weight of one or more functionalized polyolefins (A) and, where appropriate, one or more unfunctionalized polyolefins (B).

Preferably, the percentage by weight functionnalized polyolefin (s) (A), non functionnalized polyolefin (B) if any, is between 5% (excluded) and 30% relative to the total composition.

In an other possibility of the invention, the composition may also comprise at least one first additive chosen among colored dyes, pigments, bluing agents, antioxidants and UV stabilizers.

Advantageously, this or these first additives may represent up to 5 weight percent of the total composition. Preferably, these first additives represent less than 1% of the total composition from which the composite will be obtained.

In another possibility of the invention, the composition may contain at least a second additive chosen among fibers, flame-retardants and politicizes.

Advantageously, this or these second additives may represent up to 65% by weight, and advantageously 50% by weight of the total composition. As preferred, the weight percent of this (these) second additive(s) is between 5 and 40% of the total composition from which the composite is obtained.

Adding fibers may improve in particular mechanical properties such as flexural modulus or tensile strength as well as rigidity of the composite according of the invention.

Such fibers can be natural fibers of synthetic fibers. Such fibers may be in particular glass fibers.

Among flame-retardants, non halogenated flame retardant will be preferred.

As for example for non halogenated flame retardants, they can be phosphates, ammonium pyrophosphates and polyphosphates, melamine phosphates, melamine phosphates, piperazine phosphate or diphosphate, guanazole phosphate, melamine pyrophosphate, piperazine pyrophosphate and metallic phosphinates, particularly those commercialize by Clariant under commercial denomination Exolite® OP.

Non halogenated Flame-retardants such as melamin or penthaerythritol cyanurate can also be used.

Addition of plasticizer can also fine tune mechanical properties and particularly soften the composite according to the invention.

The present invention also relates to a process for manufacturing the composite as described above.

According to the invention, this process includes a step of blending the various polymers by the techniques conventionally used in the polymer field and, especially, by compounding, for example by means of a twin-screw extruder.

Furthermore, the present invention also relates to the use of such a composite and to an article manufactured from such a composite.

The present invention will now be illustrated by one particular exemplary embodiment, which will be described below. It should be pointed out that this example in no way limits the scope of the present invention.

EXAMPLE

Trials 1 to 3

Within the context of trials 1 to 3, the operating protocol for preparing the composites was strictly identical, except for the weight proportions of the polymers employed.

The polylactic acid or PLA used within the context of trials 1 to 3 was that sold by Natureworks under the reference 2002D.

The polyamide nylon-11, or PA-11, used within the context of trials 1 to 3 was that sold by Arkema France under the reference BECN O TL.

The terpolymer used within the context of trials 1 and 2 was an ethylene (67 wt %)/methyl acrylate (25 wt %)/glycidyl methacrylate (8 wt %) terpolymer sold by Arkema France under the reference LOTADER® AX8900.

In trials 1 to 3, the PLA, the PA-11 and, where appropriate, the terpolymer were introduced simultaneously, in the form of granules, into a twin-screw extruder (Werner 30) in order to be compounded (throughput: 15 kg/h; rotation speed: 190 rpm; temperatures: 170 to 210° C.).

The proportions by weight of each of the polymers introduced in trials 1 to 3 are given in Table 1 below.

TABLE 1

| Trial | PLA (parts by weight) | PA-11 (parts by weight) | Terpolymer (parts by weight) |
|---|---|---|---|
| 1 | 65 | 20 | 15 |
| 2 | 68 | 25 | 7 |
| 3 | 70 | 30 | 0 |

The composite obtained at the exit of the twin-screw extruder was in the form of granules.

These granules were then injection molded in an injection-molding machine at a temperature of 220° C. in order to form bars measuring 80×10×4 mm$^3$.

The bars obtained were then notched and then the impact strength measured, at various temperatures (from −40° C. to +40° C.) using the Izod method (ASTM D 256).

The measurements obtained are plotted in FIG. 1.

This shows that the impact strength is considerably improved with the composites obtained in trials 1 and 2 compared with that resulting from trial 3.

This impact strength is improved even in the presence of a small proportion of terpolymer by weight.

The advantages in terms of application of the composites according to the invention are numerous in view of the impact strength results, without any significant modification to the process for manufacturing composites based on just polyamide and polylactic acid (PLA/PA composites).

The composite according to the invention may of course be used to manufacture articles, such as the abovementioned consumer products. By way of nonlimiting example, mention may be made of the manufacture of compression-molded, injection-molded, extruded or thermoformed articles. These may be in the form of films, sheets, tubes, etc.

The articles obtained by using the composite, and especially the compression-molded, injection-molded, extruded or thermoformed articles, have an impact strength very substantially improved over that of articles of the same type that have been obtained by the use of a composite of the PLA/PA type.

The invention claimed is:

1. A composite having improved impact strength, comprising:
   polylactic acid (PLA) as the matrix;
   at least one polyamide as the disperse phase in said PLA matrix;
   at least one functionalized polyolefin (A) comprising α-olefin units and one and more functional group units selected from the group consisting of epoxide, carboxylic acid or carboxylic acid anhydride units; and,
   optionally, at least one unfunctionnalized polyolefin (B),
   said composite does not contain polyoxymethylene (POM).

2. The composite as claimed in claim 1, wherein at least one functionalized polyolefin (A) is selected from the group consisting of:
   an ethylene/acrylic ester/maleic anhydride terpolymer; and
   an ethylene/methyl acrylate/glycidyl methacrylate terpolymer.

3. The composite as claimed in claim 1, wherein the unfunctionnalized polyolefin (B) is an ethylene/acrylic ester copolymer.

4. The composite as claimed in claim 3, wherein the acrylic ester of the ethylene/acrylic ester copolymer is methyl acrylate, ethyl acrylate or butyl acrylate.

5. The composite as claimed in claim 1, wherein the percentages by weight of the various polymers are the following:
   40 to 80% by weight of polylactic acid (PLA);
   5 to 40% by weight of one or more polyamides; and
   1 to 30% by weight of one or more functionalized polyolefins (A) and, where appropriate, one or more unfunctionnalized polyolefins (B).

6. Composite as claimed in claim 1 the further comprising at least one first additive selected from the group consisting of coloured dyes, pigments, bluing agents, antioxidants and UV stabilizers.

7. Composite as claimed in claim 1 further comprising at least one additive selected from the group consisting of fibers, flame retardants and plasticizers.

8. A process for manufacturing a composite comprising:
   polylactic acid (PLA) as the matrix;
   at least one polyamide as the disperse phase in said PLA matrix;
   at least one functionalized polyolefin (A) comprising α-olefin units and one or more functional group units selected from the group consisting of epoxide, carboxylic acid and carboxylic acid anhydride units; and,
   optionally,
   at least one unfunctionnalized polyolefin (B),
   said composite does not contain polyoxymethylene (POM) comprising the step of blending the various polymers by compounding.

9. The process of claim 8, wherein said compounding occurs by means of a twin-screw extruder.

10. An article comprising:

polylactic acid (PLA) as the matrix;

at least one polyamide as the disperse phase in said PLA matrix;

at least one functionalized polyolefin (A) comprising α-olefin units and one or more functional group units selected from the group consisting of epoxide, carboxylic acid and carboxylic acid anhydride units; and, optionally, at least one unfunctionnalized polyolefin (B), said composite does not contain polyoxymethylene (POM), wherein said article is formed by compression molding, injection molding, extrusion or thermoforming.

* * * * *